United States Patent [19]

Himsley

[11] 4,279,755
[45] Jul. 21, 1981

[54] CONTINUOUS COUNTERCURRENT ION EXCHANGE PROCESS

[76] Inventor: Alexander Himsley, 250 Merton St., Toronto, Ontario, Canada, M4S 1B1

[21] Appl. No.: 124,861

[22] Filed: Feb. 26, 1980

[51] Int. Cl.³ .............................................. B01D 15/04
[52] U.S. Cl. .................................. 210/661; 210/676; 210/682; 210/688
[58] Field of Search ............... 210/20, 33, 37 B, 38 B, 210/38 C, 189, 268, 661, 676, 682, 688

[56] References Cited

U.S. PATENT DOCUMENTS

| | | | |
|---|---|---|---|
| 3,019,079 | 1/1962 | Donohue | 210/20 |
| 3,215,624 | 11/1965 | Frazer et al. | 210/33 |
| 3,549,526 | 12/1970 | Brown | 210/33 |
| 3,551,118 | 12/1970 | Cloete et al. | 210/33 |
| 3,773,889 | 11/1973 | George et al. | 423/6 |
| 4,018,677 | 4/1977 | Himsley | 210/33 |
| 4,035,292 | 7/1977 | Himsley | 210/33 |

OTHER PUBLICATIONS

Selke et al., "Continuous Countercurrent Ion Exchange", Chem. Eng. Progress, 47, (1959), pp. 529-533.
Slater, M. J., "Continuous Ion Exchange Plant Design Methods and Problems", Hydrometallurgy, 4, (1979), pp. 299-316.

Primary Examiner—Ivars C. Cintins
Attorney, Agent, or Firm—Ridout & Maybee

[57] ABSTRACT

A process for absorbing ions of interest onto ion exchange resin particles from a feed liquor containing ions which when absorbed on said particles cause the density of the particles to increase. The process comprises the steps of
(1) flowing the feed liquor upwardly through a main bed of ion exchange resin particles contained in a main chamber of an absorption column and thereby maintaining the bed in fluidized state;
(2) continuously collecting the denser loaded particles from the lower region of the absorption column;
(3) passing an outflow of the feed liquor from the upper region of the main chamber upwardly into the lower region of the polishing chamber containing a secondary bed of fluidized ion exchange resin particles whereby residual ions of interest are polished from the liquor, and
(4) producing a barren liquor flowing out of the upper region of the polishing chamber.

10 Claims, 1 Drawing Figure

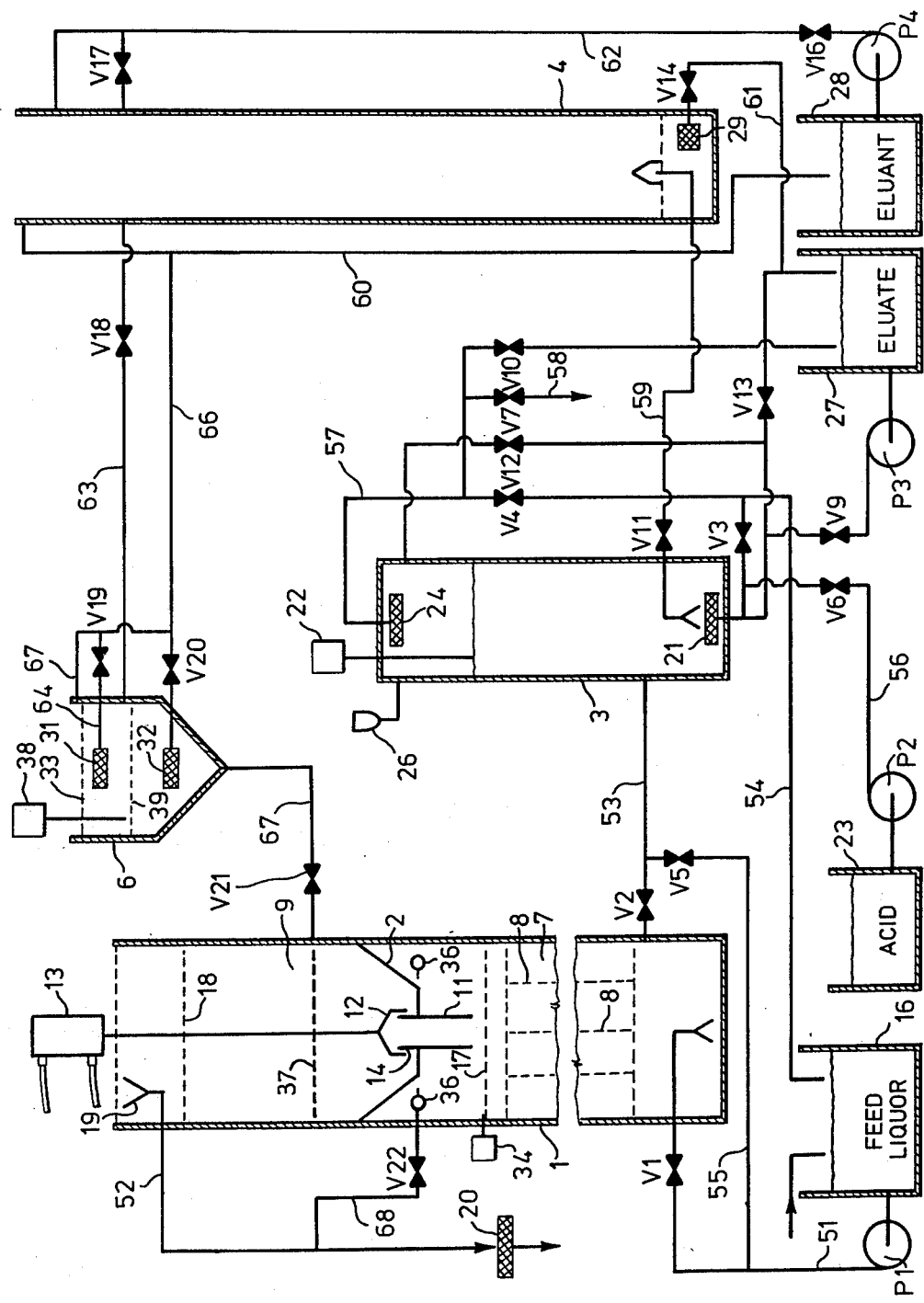

CONTINUOUS COUNTERCURRENT ION EXCHANGE PROCESS

BACKGROUND OF THE INVENTION

The invention relates to a continuous countercurrent ion exchange process employing a liquid-solids contactor.

The application of ion exchange techniques for the separation of substances on an industrial scale has resulted in the development of continuous processes whereby a feed liquor containing the substance of interest is uninterruptedly made to flow through a bed of ion exchange resin particles where the substance was absorbed onto the particles. In order to maintain the efficiency of the process, means have been devised to remove loaded resin particles from the absorption bed to an elution bed where the substance of interest is removed from the particles. In a continuous process, movement of particles from the absorption bed to the elution bed and back is required. U.S. Pat. Nos. 4,018,677 and 4,035,292 in the name of the present applicant, show processes wherein intermittently a batch of loaded particles is removed from an absorption column and is transferred to an elution column.

When designing an absorption process for incorporation into a continuous countercurrent system, the simplest approach is to provide a suitable chamber with a single bed of ion exchange resin particles. One method of bringing the feed liquor into contact with the resin particles is to maintain the resin bed in a fluidized state and to flow the feed liquors vertically upwardly through the fluidized bed. While the ions of interest will be absorbed onto the resin particles when contacting a feed liquor, with such a fluidized resin bed there is a tendency for the particles to classify according to particle size and density. This will eventually lead to back-mixing of the resin particles, i.e., a mixing of loaded particles with unloaded particles. This back-mixing is undesirable because in such a fluid-solid contactor it results in entrapment of loaded resin particles in the upper region of the fluidized bed thereby greatly reducing the efficiency of the separation process.

Various methods have been described to overcome these problems. The applicant has developed a multi-chambered contactor as disclosed in U.S. Pat. No. 4,035,292, which has proved to display a high degree of utility in overcoming these problems.

Although the continuous contactor disclosed in U.S. Pat. No. 4,035,292 is capable of handling feed solutions containing higher levels of suspended solids than prior fixed bed columns, in order to achieve transfer of batches of resin particles between vertically adjacent compartments of the contactor column, normally reliance is placed on withdrawing liquid from a lower compartment and recirculating this liquid through a pump to the adjacent upper compartment, whereby a net downflow of liquid between the two compartments can be achieved which carries the particles down with it. The liquid is withdrawn from the lower compartment through a screen located in the lower compartment in order to prevent resin particles from being drawn into the pump. This column is not completely satisfactory for use with highly turbid feed liquors having levels of suspended solids up to 20 to 30% as there is a risk of the screens within the column becoming blocked and access to these screens for cleaning purposes cannot, in most instances, be gained without shutting down the column, and, moreover, in the event of a pump failure there is risk of the suspended solids settling and clogging the conduits that interconnect the compartments externally of the columns.

The present invention relates to the use of a fluidized resin bed for absorption of a substance from a feed solution whereby the resin particles appreciably increase in density as they become loaded thereby migrating toward the lower region of the chamber. This effect can be observed in a number of hydrometallurgical applications, for example, the extraction of uranium from a pregnant leach liquor.

Because the resin particles increase in density as they are loaded, and thus, classify toward the bottom of the fluidized bed, in the process of the present invention, back-mixing is considerably reduced and loaded particles can be collected continuously from the bottom of the column. It has been found that a considerable increase in absorption column efficiency is obtained by providing a small fluidized bed above the main bed to remove substantially all residual ions of interest from the out-flowing solution.

SUMMARY OF THE INVENTION

The invention provides a process for absorbing ions of interest onto ion exchange resin particles from a feed liquor containing ions which when absorbed on said resin particles cause the density of the particles to increase, comprising the steps of flowing the feed liquor upwardly through a main bed of ion exchange resin particles contained in a main chamber of an absorption column and thereby maintaining the bed in a fluidized state, the resin being one on which the ions of interest are preferentially absorbed onto the resin particles causing the density of the loaded resin particles to increase and migrate toward the lower region of said column, continuously collecting loaded particles from the lower region of the column, passing an outflow of the feed liquor from the upper region of the main chamber upwardly into the lower region of a polishing chamber containing a secondary polishing bed consisting of a batch of predetermined size of fluidized ion exchange resin particles whereby residual ions of interest in said outflow from the main bed are substantially completely absorbed onto the resin particles in the polishing bed, and thereby producing a barren liquor flowing out of the upper region of the polishing chamber.

This process for absorbing ions of interest is most advantageously used when incorporated into a system where continuous countercurrent movement of resin particles takes place in a closed cycle through an absorption column and an elution column.

BRIEF DESCRIPTION OF THE DRAWINGS

The accompanying drawings show a schematic view of the absorption column used in the process as incorporated into a continuous countercurrent closed cycle resin system.

DESCRIPTION OF THE PREFERRED EMBODIMENT

Referring to the drawings, an absorption column 1 comprises a vertically disposed cylindrical vessel having a flat bottom and open upper end. Column 1 is separated into two chambers by partition 2 located in its upper portion. Backwash chamber 3, elution column 4, and rinsing chamber 6 comprise the other main vessels employed in the process of the invention.

Column 1 has main chamber 7 equipped with vertical flow straighteners 8. Communication between the main chamber 7 and the upper polishing chamber 9 occurs by way of vertical conduit 11 located centrally through partition 2. Conduit 11 is equipped at its upper end with baffle 12 vertically movable by a pressure cylinder and piston 13 to seal conduit opening 14, when required.

The process of this invention is suitable for ion exchange applications whereby the ion exchange resin particles become more dense upon absorption of ions from a feed liquor. Such an application is the extraction of uranium containing ions from a feed solution obtained by leaching a crushed ore with sulfuric acid.

The absorption column 1 is provided with ion exchange resin particles distributed so that the main chamber 7 preferably contains between about four to twenty times the volume of the batch of particles contained in the polishing chamber 9. More preferably, the chamber 7 contains approximately nine times the volume of resin particles that is contained in polishing chamber 9, and all of the resin particles in column 1 are maintained in a fluidized state by a continuous upward flow of liquid. The ratio depends on the time for a volume of resin equivalent to that in the polishing chamber to become saturated by the feed solution flow, and on the time taken for a batch of resin to pass through the back washing, elution and rinsing cycle.

Feed liquor is pumped from reservoir 16 by pump P1 through pipe 51 and valve V1 into the lower portion of absorption column 1. The rate at which the feed solution flows upwardly through column 1 is sufficient to maintain the level of fluidized resin particles in chamber 7 at approximately that indicated by dotted line 17 some considerable distance below the lower end of conduit 11, so that there is little or no risk of particles from the lower chamber 7 being carried up into the upper chamber 9. The liquid continues to flow upwardly through conduit 11 into chamber 9. The upward flow is directed radially by a baffle 12 maintaining the level of fluidized resin particles in chamber 9 approximately at dotted line 18. After the feed liquor has contacted the resin particles in upper chamber 9, the barren liquor flows from the top portion of chamber 9 through overflow weir 19 and pipe 52. Externally of the column, the barren liquor is passed through a screen 20, preferably of the type known as a Dutch School of Mines screen, which collects any stray resin particles that escape over the weir 19, for return to the system.

As the feed liquor flows through chamber 7 of column 1, most of the ions of interest are absorbed onto the resin particles of the main bed. Since the loaded particles are denser than regenerated particles, the loaded particles tend to migrate toward the lower region of the bed. Absorption of ions of interest onto resin particles is an equilibrium process, and for this reason complete removal of ions of interest from the feed solution is not possible. The absorption process is optimized however, by contacting the feed solution with the freshly-eluted resin in the polishing chamber 9. This secondary contacting step polishes most of the remaining ions of interest from the feed liquor leaving an essentially barren liquor to flow out of the upper region of column 1.

Flow straighteners 8 in main chamber 7, are provided to reduce turbulence. Back mixing of loaded particles will occur to an undesirable extent if the upward fluid flow is turbulent. By incorporating the flow straighteners 8 in chamber 7, a non-turbulent upward flow of feed liquor is achieved, which produces the desired concentration gradient in the liquor, and a corresponding classification of resin particles according to density is promoted.

The flow straighteners 8 can consist of intersecting vertical partitions, vertical pipes, a vertically disposed honeycomb structure, or any other similar device which directs the upward flow of fluid so as to reduce turbulence.

Loaded resin particles are continuously removed from the lower region of chamber 7 through valve V2 in pipe 53. Pipe 53 has a relatively small bore so that only a small portion of the upward flow in column 1 is diverted. The continuous flow of loaded resin particles from chamber 7 proceeds through pipe 53 to chamber 3 where the carrier feed liquor is drained off through screen 21, valve V3 and pipe 54 to reservoir 16. Valve V4 is also opened to provide a vent for chamber 3 during this step. The level of loaded resin particles is allowed to build up until resin sensor 22 is activated. This batch of loaded resin particles is then isolated in chamber 3 by closing valves V2, V3, and V4.

By opening valves V2 and V5, a portion of the flow of feed liquor being pumped by pump P1 is diverted through pipe 55 and valve V5 thereby flushing resin particles from pipe 53. This flushing procedure requires only a few seconds and is desirable to ensure that pipe 53 does not become clogged.

The resin in backwash chamber 3 is washed with an appropriate acid solution to remove unwanted particulate matter and slime. Acid is pumped through pump P2 from reservoir 23 through pipe 56 and valve V6 into chamber 3. If necessary, compressed air may first be introduced into the bottom of the chamber 3 to scour slimes that may be adhering to the resin before the acid-washing step.

By opening valve V7, a flow circuit is completed for the backwashing step. Thus, the circulation of washing acid proceeds upwardly through screen 21, through the resin particles in chamber 3 exiting at the top through screen 24, and flowing through pipe 57, valve V7 and pipe 58 to return to the leach circuit (not shown).

When the backwashing step is completed, pump P2 is stopped, valves V6 and V7 closed and the liquid in chamber 3 drained to reservoir 16 by opening valve V3. During the draining step vacuum breaker 26 located near the top of chamber 3, permits air to enter chamber 3. Valve V3 is then closed and chamber 3 is then filled with eluate by opening valves V9 and V10 and starting pump P3. When chamber 3 is full then valve V10 is closed and valves V11 and V12 are opened and the backwashed resin is transferred from chamber 3 with eluate from reservoir 27, thereby creating a flow of fluidized resin particles through pipe 59 into the lower region of elution column 4. The resin in the elution column rises as a plug and eluant is displaced from the top of column 4 to the eluant reservoir 28 through line 60.

When the resin transfer is complete, as indicated by resin particles no longer passing along line 59, pump P3 is stopped and valves V9, V11 and V12 are closed, and chamber 3 is drained by opening valves V10 and V13. Air enters chamber 3 through valve V10 displacing the liquid drained in this step. Once chamber 3 has been drained of eluate, valve V10 and V13 are closed and the continuous removal of loaded resin particles from the bottom of column 1 can be recommenced by opening valves V2, V3, and V4.

The elution step is performed on a packed bed of resin particles rather than on a bed of fluidized particles. Thus, after the transfer of resin from chamber 3 to column 4 is complete, valve V14 is opened to allow the resin plug to descend and expel through screen 29 and pipe 61 into reservoir 27 and eluate that was used to transport the resin.

The plug of resin comprises several, e.g., six or seven, of the measured batches that are isolated each time in the backwashing chamber 3. Elution is accomplished by pumping a predetermined quantity of eluant at a controlled flow rate by means of pump P4 from reservoir 28 through valve V16 in pipe 62. Elution column 4 is an open topped cylindrical vessel. Eluant flows downwardly through the uppermost batches of the resin plug under the influence of gravity and strips ions of interest from the resin particles. Concentrated eluate is displaced from the bottom of column 4 at a controlled rate through screen 29 and valve V14 into eluate reservoir 27.

During the elution process, resin particles move in a stepwise manner up the column as new batches of loaded particles are periodically introduced into the lower portion of column 4 from chamber 3. As the cycle of elution and movement up column 4 proceeds, resin particles toward the top of the column become virtually free of absorbed ions of interest. These regenerated resin particles can then be reintroduced into the absorption column thereby maintaining the continuity of the entire process.

After each fresh measured batch of loaded resin particles is introduced into the lower region of column 4, the level of the top of the resin plug is each time raised by a constant amount corresponding to the volume of the resin particles that have been introduced at the bottom. A batch of regenerated particles at the top of the resin plug is then slurried from column 4 either directly into the polishing chamber 9 of absorption column 1, or initially into rinsing chamber 6 followed by the transfer of the batch of resin particles to chamber 9.

Referring to FIG. 1, a batch of regenerated resin particles is slurried from the upper region of elution column 4 to rinsing chamber 6 by employing pump P4 to pump eluant through valves V16 and V17. The fluidized resin flows from column 4 through valve V18 in pipe 63 and into rinsing chamber 6. Valve V19 in line 64 is opened to allow excess eluant to return to reservoir 28. Line 64 is equipped with screen 31 to prevent any loss of resin particles during this transfer.

When particles no longer run along line 63, valves V17 and V18 are closed, and the eluant in rinsing chamber 6 is drained through screen 32, valve V20 and pipes 66 and 60 into reservoir 28. This procedure provides that the volume of resin slurried each time from the top of the column 4 is a measured volume corresponding in size to the volume of loaded particles introduced at the bottom of the column. Valve V20 is then closed and the resin particles in chamber 6 can be rinsed using an external source of water or by opening valve V21 thereby allowing barren solution from polishing chamber 9 to flow into chamber 6 through pipe 67. With valve V19 closed the level of rinsing liquid is allowed to rise to dotted line 33 and valve V21 is then closed. Pipe 67 exiting from the top portion of chamber 6 serves as an overflow drain for this step. For the rinsing operation to be conducted in this manner, it is of course necessary for the apparatus to be modified slightly in comparison with that shown, to provide for the side wall of the polishing chamber 9 and the overflow outlet 19 to extend above the level 33. When rinsing the regenerated resin particles in chamber 6 with barren liquor from polishing chamber 9, chamber 9 contains no resin particles. Thus, this rinsing step occurs after the transfer of particles from the polishing chamber 9 to the main absorption chamber 7, which is described hereinafter, has been carried out.

Referring to the operation of the absorption column 1, the transfer of the batch of fluidized resin particles from polishing chamber 9 to main chamber 7 is carried out when the concentration of ions of interest reaches a predetermined level at sampling point 34 just above the main resin bed.

The transfer of resin particles from chamber 9 to main chamber 7 is gravity-assisted by opening valve V22 in an auxiliary outlet pipe 68. Since the resin particles are carried along in the liquid flow, precautions must be taken to avoid loss of resin through pipe 68. One means of achieving this would be to equip pipe 68 with a screen located within chamber 7 to filter out the resin particles. The disadvantage of this procedure is that the screen may eventually become clogged necessitating a shutting down of the system to clean the screen.

In the example illustrated in FIG. 1, the transfer of resin particles from polishing chamber 9 to main chamber 7 is accomplished without employing a screen on exit pipe 68. Instead, conduit 11 extends down into chamber 7 so that the extent of tube 11 defines a volume between its lower end and exit pipe 68 which is significantly greater than the volume of liquid required to wash all of the particles from polishing chamber 9 into chamber 7. Thus, during the transfer of particles into chamber 7 from chamber 9, the fluidized particle level will not reach the level of the fluid draining out pipe 68.

As a further safeguard in this regard, pipe 68 is equipped with a collecting device 36 comprising an annular trough provided with a plurality of holes. This collecting device reduces the risk of loss of resin particles out the drain pipe 68 due to a funneling effect.

In addition the transfer of particles from chamber 9 to chamber 7 can be assisted by reducing the upward flow of feed liquor as controlled by pump P1.

The regenerated resin particles transferred from chamber 9 to chamber 7 will be less dense than the loaded or partially loaded particles in the main bed, and therefore these fresh particles will initially remain substantially in the upper portion of the main resin bed in chamber 7.

The column continues to operate with flow exiting through valve V22 and pipe 68 until a batch of freshly-regenerated resin is placed in chamber 9. The liquid level is maintained in chamber 9 due to the pipe 68 being taken up to a level so that resin entering chamber 9 is discharged into liquid to obviate the risk of breaking the resin by discharging it into any empty chamber.

The level of liquid is lower than the bottom of the rinse chamber 6. After carrying out the operation of rinsing the particles in chamber 6, as described above, the resin particles are slurried under the influence of gravity into the polishing chamber 9 by sealing off the opening 14 by using the piston 13 to lower the baffle 12 and opening valve V21.

When the transfer of particles from chamber 6 to chamber 9 is complete, valves V21 and V22 are closed and the baffle 12 is raised and the normal upward flow through column 1 recommences. Rinsing chamber 6 may then be cleaned using an external water source and the wash water discarded through drain piping (not shown). Rinsing chamber 6 is then filled with eluant to a level as determined by level sensor 38. The level 39 of eluant in chamber 6 should be just below the point of connection of line 63 so that when particles are transferred to chamber 6 from elution column 4, the entering particles will continue to be fluidized thereby minimizing particle attrition during this step.

Alternatively, resin particles in chamber 6 may be transferred to polishing chamber 9 opening valve V22 to reduce the liquid level in chamber 9 to level 37. Valve V22 is then closed and valve V21 opened allowing the resin in chamber 6 to slurry through pipe 67 into chamber 9 under the influence of gravity. When the transfer is complete valve V21 is closed. Level 37 and the point at which pipe 67 enters chamber 9 are situated so that the transfer of resin is completed and the resin bed in chamber 9 can stabilize, and all turbulence become dissipated, before the liquid level reaches exit weir 19.

This counter-current process proceeds continuously so that the introduction of feed liquor into absorption column 1 need never be interrupted during normal operation.

The system as described can be further simplified by removing rinsing chamber 6 and slurrying a batch of regenerated resin particles directly into polishing chamber 9 subsequent to the transfer of resin from chamber 9 to main chamber 7.

Variations and modifications of the preferred embodiment of the process, without departure from the scope of the invention as described herein and as set forth in the appended claims, will be apparent to the reader skilled in the art.

What I claim is:

1. A process for absorbing ions of interest onto ion exchange resin particles from a feed liquor containing ions which when absorbed on said resin particles cause the density of the particles to increase, comprising the steps of continously flowing the feed liquor upwardly through a main bed of ion exchange resin particles contained in a main chamber of an absorption column and thereby maintaining the bed in a fluidized state, the resin being one on which the ions of interest are preferentially absorbed onto the resin particles causing the density of the loaded resin particles to increase and migrate toward the lower region of said column, continuously collecting loaded particles from the lower region of the column, normally passing an outflow of the feed liquor from the upper region of the main chamber upwardly into the lower region of a polishing chamber containing a secondary polishing bed consisting of a batch of predetermined size of fluidized ion exchange resin particles whereby residual ions of interest in said outflow from the main bed are substantially completely absorbed onto the resin particles in the polishing bed, thereby producing a barren liquor flowing out of the upper region of the polishing chamber, the batch of resin particles contained in the main chamber corresponding in volume to between about four to about twenty of the batches of particles contained in the polishing chamber, periodically diverting the outflow of the feed liquor from the upper region of the main chamber to an auxiliary outlet, transferring the batch of resin particles from the polishing chamber to the main chamber while maintaining the flow of feed liquor upwardly through the main chamber to maintain the particles fluidized therein, replenishing the polishing chamber by introducing into it a fresh batch of particles, and thereafter recommencing the outflow of the feed liquor from the upper region of the main bed upwardly into the lower region of the polishing chamber.

2. A process according to claim 1, wherein the ions of interest contain uranium or copper.

3. A process according to claim 1, wherein the feed liquor flows upwardly through the main bed of resin particles contained in a main chamber equipped with flow straightening means.

4. A process according to claim 1, wherein the volume of resin particles contained in the main chamber corresponds in size to approximately nine of the batches of particles contained in the polishing chamber.

5. A process according to claim 1, wherein loaded resin particles are continuously collected from the lower region of the absorption column and isolated in an auxiliary chamber.

6. A process according to claim 5, wherein the collection of loaded resin particles from the lower region of the absorption column is intermittently interrupted when a batch of predetermined size of said particles has been isolated in the auxiliary chamber.

7. A process for absorbing ions of interest onto ion exchange resin particles from a feed liquor containing ions which when absorbed on said resin particles cause the density of the particles to increase, comprising the steps of flowing the feed liquor upwardly through a main bed of ion exchange resin particles contained in a main chamber of an absorption column and thereby maintaining the bed in a fluidized state, the resin being one on which the ions of interest are preferentially absorbed onto the resin particles causing the density of the loaded resin particles to increase and migrate toward the lower region of said column, continuously collecting loaded particles from the lower region of the column, passing an outflow of the feed liquor from the upper region of the main chamber upwardly into the lower region of a polishing chamber located immediately vertically above the main chamber containing a secondary polishing bed consisting of a batch of predetermined size of fluidized ion exchange resin particles whereby residual ions of interest in said outflow from the main bed are substantially completely absorbed onto the resin particles in the polishing bed, thereby producing a barren liquor flowing out of the upper region of the polishing chamber, the batch of resin particles contained in the main chamber corresponding in volume to between about 4 to about 20 of the batches of particles contained in the polishing chamber, and including the step of transferring the resin particles contained in the polishing chamber to the main chamber by withdrawing a liquid flow from a region intermediate of the polishing and main chambers so as to allow the batch of fluidized resin particles contained in the polishing chamber to fall downward into the main chamber.

8. A process according to claim 7, wherein the resin particles are transferred from the polishing chamber to the main chamber through a conduit having its lower end extending into the main chamber and disposed remotely from the region intermediate of the polishing and main chambers from which the liquid is withdrawn.

9. A process according to claim 7, wherein a rinsing chamber containing a batch of predetermined size of regenerated resin particles is connected to the polishing chamber, and including the step of transferring the regenerated resin particles from the rinsing chamber to the polishing chamber by discontinuing the flow from the said intermediate region between the polishing and main chambers and commencing the withdrawal of liquid from a point within the polishing chamber, thereby reducing the level of liquid in the polishing chamber, and transferring the batch of regenerated resin particles in a slurry to the polishing chamber.

10. A process according to claim 9, wherein the rinsing chamber is located vertically above said reduced level of liquid in the polishing chamber, and including the step of permitting the slurry to flow from the rinsing chamber to the polishing chamber under the influence of gravity, the said reduced level being low enough so that the resulting resin bed in the polishing chamber stabilizes before the liquid in the chamber reaches the point at which barren liquid flows out of the upper region of the polishing chamber.

* * * * *